(12) United States Patent
Gong et al.

(10) Patent No.: US 8,570,435 B2
(45) Date of Patent: Oct. 29, 2013

(54) VIDEO PROCESSING METHOD AND DEVICE THEREOF

(75) Inventors: Jin-Sheng Gong, HsinChu (TW); Hsieh Chun-Hsing, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 627 days.

(21) Appl. No.: 12/572,979

(22) Filed: Oct. 2, 2009

(65) Prior Publication Data

US 2010/0020231 A1   Jan. 28, 2010

(30) Foreign Application Priority Data

Mar. 10, 2008  (TW) ............................. 97138196 A

(51) Int. Cl.
*H04N 7/01* (2006.01)
*H04N 11/20* (2006.01)

(52) U.S. Cl.
USPC ........... 348/445; 348/441; 348/456; 348/459; 348/443; 348/448; 348/489; 348/584; 348/569; 348/554; 348/598; 348/581; 348/647; 348/701; 348/706; 348/256; 348/396.1

(58) Field of Classification Search
USPC ......... 348/445, 441, 584, 569, 456, 459, 678, 348/443, 448, 554, 598, 581, 489, 256, 348/396.1, 701, 706
See application file for complete search history.

(56) References Cited

U.S. PATENT DOCUMENTS

| | | | | |
|---|---|---|---|---|
| 5,796,445 A * | 8/1998 | Nomura et al. | ............... | 348/607 |
| 8,059,674 B2 * | 11/2011 | Cheung et al. | ................ | 370/463 |
| 2003/0086016 A1 * | 5/2003 | Voltz et al. | ..................... | 348/459 |
| 2004/0070687 A1 * | 4/2004 | Voltz et al. | ..................... | 348/448 |
| 2004/0212730 A1 * | 10/2004 | MacInnis et al. | ............. | 348/441 |
| 2005/0122341 A1 * | 6/2005 | MacInnis et al. | ............. | 345/558 |
| 2006/0146168 A1 * | 7/2006 | Nishi et al. | ............... | 348/333.01 |
| 2007/0046793 A1 * | 3/2007 | Sudo | ............................. | 348/256 |
| 2007/0296858 A1 * | 12/2007 | Eymard et al. | ................ | 348/456 |
| 2008/0174700 A1 * | 7/2008 | Takaba | ......................... | 348/678 |
| 2009/0109290 A1 * | 4/2009 | Ye et al. | ......................... | 348/155 |
| 2009/0268089 A1 * | 10/2009 | Mori et al. | ..................... | 348/459 |
| 2010/0013988 A1 * | 1/2010 | Hulyalkar et al. | ............ | 348/441 |
| 2010/0315548 A1 * | 12/2010 | Suen et al. | ..................... | 348/441 |

FOREIGN PATENT DOCUMENTS

TW           I268708 B      12/2006

OTHER PUBLICATIONS

English Abstract for TW Office Action.
TW Application 97A-114TW.
TW Office Action.

* cited by examiner

*Primary Examiner* — Jefferey Harold
*Assistant Examiner* — Mustafizur Rahman
(74) *Attorney, Agent, or Firm* — McClure, Qualey & Rodack, LLP

(57) ABSTRACT

A video processing method and a device thereof are described. The method includes the steps as follows. An input video signal is received, in which a single period of the input video signal has a plurality of first input frames and a plurality of second input frames. The input video signal is processed, so as to generate an output video signal, in which a single period of the output video signal has a plurality of first output frames and a plurality of second output frames, and an amount of the first output frames is the same as an amount of the second output frames. A sum of the amount of the first output frames and the amount of second output frames is an integer multiple of a sum of an amount of the first input frames and an amount of the second input frames.

38 Claims, 6 Drawing Sheets

VIDEO PROCESSING METHOD AND DEVICE THEREOF

CROSS-REFERENCES TO RELATED APPLICATIONS

This non-provisional application claims priority under 35 U.S.C.§119(a) on Patent Application No. 97138196 filed in Taiwan, R.O.C. on 2008 Oct. 3, the entire contents of which are hereby incorporated by reference.

BACKGROUND

1. Technical Field

The disclosure relates to a video processing method and a device thereof, and more particularly to a video processing method and a device thereof applied when motions of video objects are rough.

2. Related Art

Video images have various frequencies, for example, a specification for a film is 24 Hz (that is to say, the film is shot or played in a rate of 24 frames per second), the National Television Standard Committee (NTSC) specification is 60 Hz, and the Phase Alternating Line (PAL) specification is 50 Hz. Therefore, when image data having different frequencies are played on various playing devices, for example, a TV set or a Digital Video Disc (DVD) player, the image data must be converted to a matching playing specification through video processing.

The motion-estimation-motion-compensation (MEMC) is a typical video processing mode, in which the image data at a certain frequency is converted to the image data at another frequency through interpolation and then is displayed. Thus, when a frame is changed, a distance of a motion of an object becomes short, thereby solving the problem of image signal lag and doubling. The MEMC is an intuitive solution, but must be achieved by costing a large amount of software/hardware resources. Further, the algorithm is too complicated, so distinct error images are easily generated due to misjudgment of the object motion during the algorithm process.

Therefore, a video processing method, which does not have the high requirements for software and hardware and has a simpler algorithm, is also available, that is, 3:2 pull down. According to this method, an original 24 Hz image data may be converted to a 60 Hz image data satisfying the NTSC specification. For example, the original frames are {A, B, C, D}, after a 3:2 pull down process, the frames are changed to {A, A, A, B, B, C, C, C, D, D}, so it is known that a proportion between amounts of the converted frames is 3:2. In the converted image data, some frames are repeated for 3 times and some frames are repeated for twice, so the moving objects in the frames move at different speeds, resulting in a feeling of rough motions.

Therefore, in Taiwan, R.O.C Patent Application No. 94127529, entitled "Video Processing Method Capable of Preventing Rough Movement of Video Object and Related Device" (the patent is granted, and the patent number is 1268708), the proportion between the amounts of the converted frames is changed from 3:2 to 3:3 (when an output frequency is 72 Hz) or 2:2 (when the output frequency is 48 Hz), so as to solve the problem of the rough motion of the image. However, in the patent, a video signal must be read according to a first refresh frequency, and the adjusted video signal is output according to a second refresh frequency. That is to say, in the patent, a timing control action must be executed, so circuits related to the timing control must be added, thereby causing an additional cost. In addition, for a liquid crystal display (LCD), sometimes the timing control results in a panel compatibility problem, and some panels even do not allow changes to display timing.

Therefore, the problems resulting from the video image processing need to be solved urgently.

SUMMARY

Accordingly, the disclosure is directed to a video processing method and a device thereof, so as to solve problems in the original 3:2 pull down video processing method of unequal timing lengths, large motion distance, and image lag and doubling resulting from a visual persistence. Further, in the disclosure, a timing control action is not executed, such that circuits related to the timing control are not added, thereby saving a cost and preventing a panel compatibility problem resulting from change to display timing of the panel.

The disclosure provides a video processing method, which includes the steps as follows. An input video signal is received, in which a single period of the input video signal has a plurality of first input frames and a plurality of second input frames. The input video signal is processed, so as to generate an output video signal, in which a single period of the output video signal has a plurality of first output frames and a plurality of second output frames, and an amount of the first output frames is the same as an amount of the second output frames. A sum of the amount of the first output frames and the amount of second output frames is an integer multiple of a sum of an amount of the first input frames and an amount of the second input frames.

The disclosure also provides a video processing method, which includes the steps as follows. An input video signal is received, in which a single period of the input video signal has a plurality of first input frames and a plurality of second input frames. The input video signal is processed, so as to generate an output video signal, in which a single period of the output video signal has a plurality of first output frames and a plurality of second output frames. Brightness of a plurality of preset frames in the output video signal is adjusted according to an average brightness, so as to obtain a black frame and/or a gray frame.

The disclosure further provides a video processing device, which includes a receiving module and a processing module. The receiving module receives an input video signal, in which a single period of the input video signal has a plurality of first input frames and a plurality of second input frames. The processing module processes the input video signal, so as to generate an output video signal, in which a single period of the output video signal has a plurality of first output frames and a plurality of second output frames, an amount of the first output frames is the same as an amount of the second output frames, and a sum of the amount of the first output frames and the amount of second output frames is an integer multiple of a sum of an amount of the first input frames and an amount of the second input frames.

The disclosure further provides a video processing device, which includes a receiving module, a processing module, a setting module, and an adjusting module. The receiving module receives an input video signal, in which a single period of the input video signal has a plurality of first input frames and a plurality of second input frames. The processing module processes the input video signal, so as to generate an output video signal, in which a single period of the output video signal has a plurality of first output frames and a plurality of second output frames. The setting module sets an average brightness of the output video signal. The adjusting module adjusts brightness of a plurality of preset frames in the output video signal according to the average brightness, so as to obtain a black frame and/or a gray frame.

The embodiments and efficacies of the disclosure will be illustrated in detail below with reference to the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
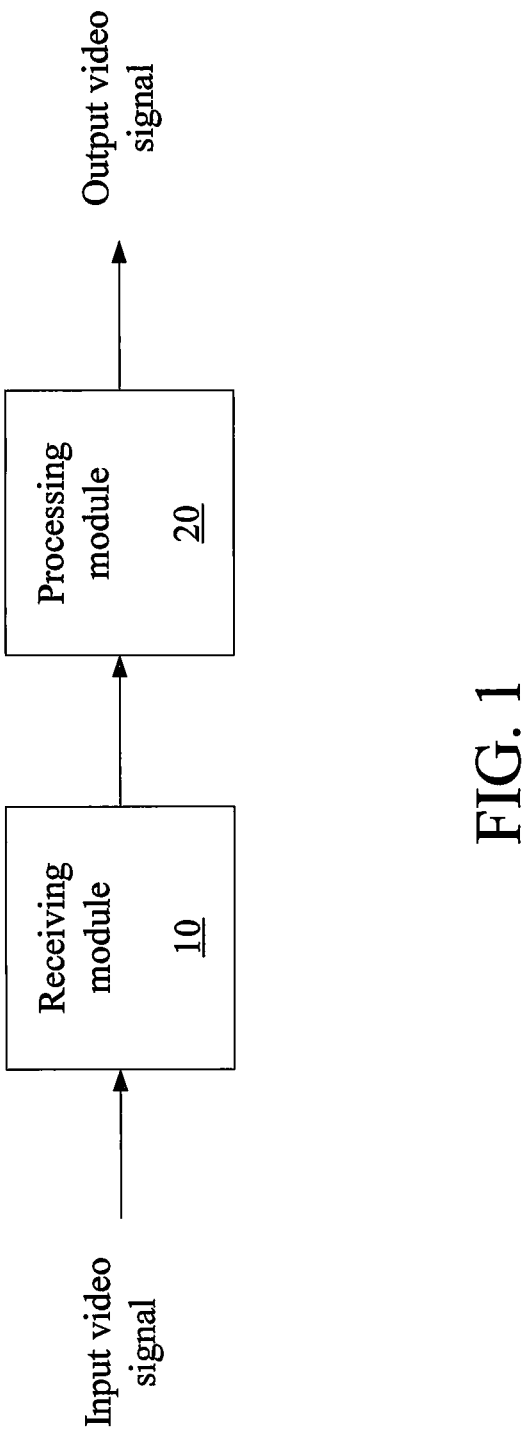
FIG. 1 is a schematic view of a first embodiment of a video processing device.

FIG. 1 is a schematic view of a first embodiment of a video processing device. Referring to FIG. 1, the video processing device includes a receiving module 10 and a processing module 20.

The receiving module 10 receives an input video signal, in which a single period of the input video signal has a plurality of first input frames and a plurality of second input frames. A proportion between an amount of the first input frames and an amount of the second input frames is a first proportion. For example, a film is usually shot or played at a rate of 24 frames per second, that is, a frequency of the input video signal is 24 Hz. It is assumed that original frames are {A, B, C, D}. The 24 Hz image signal is converted to a 60 Hz signal satisfying an NTSC specification through a 3:2 pull down process and a de-interlace process. The processed frames are changed to {A, A, A, B, B, C, C, C, D, D}. Therefore, the input video signal may be a 3:2 pull down image, 3 frames A and 2 frames B exist in a first period, and the first proportion is 3:2. That is to say, the proportion between the amounts of the frames in the input video signal is always 3:2.

The processing module 20 processes the input video signal, so as to generate an output video signal. A single period of the generated output video signal has a plurality of first output frames and a plurality of second output frames, an amount of the first output frames is the same as an amount of the second output frames, and a proportion between the amount of the first output frames and the amount of the second output frames is a second proportion.

For example, consumers have higher requirements for image playing quality, so the conventional 60 Hz image signal cannot satisfy the consumers, and a 120 Hz image signal has become the main stream in the recent market. In the above example, after the 3:2 pull down process of the 24 Hz input video signal, the 24 Hz input video signal becomes the 60 Hz image signal. Then, the 60 Hz image signal is converted to the 120 Hz image signal, that is, the frequency is doubled, such that the original 3:2 (A, A, A, B, B) image signal becomes a 6:4 (A, A, A, A, A, A, B, B, B, B) image signal. In the disclosure, in order to solve the problem of the rough motion of the video object, the processing module 20 is used to process the input video signal. Here, the processing module 20 processes the 6:4 (A, A, A, A, A, A, B, B, B, B) image signal, so as to generate a 5:5 (A, A, A, A, A, B, B, B, B, B) output video signal in the single period, that is, the proportion between the amount of the first output frames and the amount of the second output frames is 5:5. Particularly, one frame A is deleted, and one frame B is added, such that the amount of the frames A is the same as the amount of the frames B. In this manner, a motion speed of each video object in the frames is even, thereby solving the problem of the rough motion of the video object in the prior art.

In addition, a sum of the amount of the first output frames and the amount of second output frames is an integer multiple of a sum of the amount of the first input frames and the amount of the second input frames. It is known from the above example that the proportion between the amount of the first output frames and the amount of the second output frames is 5:5, so the sum of the amounts is "10"; the proportion between the amount of the first input frames and the amount of the second input frames is 3:2, so the sum of the amounts is "5", so the sum of the amount of the first output frames and the amount of second output frames is twice of the sum of the amount of the first input frames and the amount of the second input frames (10/5=2). The sum of the amount of the first output frames and the amount of second output frames is the integer multiple of the sum of the amount of the first input frames and the amount of the second input frames, so in the disclosure, a timing control action is not executed, and circuits related to the timing control are not needed, thereby saving a cost and preventing a panel compatibility problem.

The frequency of the input video signal may be not only 24 Hz, but also 30 Hz or 60 Hz and the like. When the input video signal is 30 Hz, the 2:2 pull down process may be performed, and the converted frequency is 60 Hz. Then the frequency is doubled to become the 120 Hz 4:4 output video signal. Here, the sum of the amount of the first output frames and the amount of second output frames is still an integer multiple of the sum of the amount of the first input frames and the amount of the second input frames, and the frequency of the output video signal may be 120 Hz, which is the main stream in the recent market.

Figure 2:
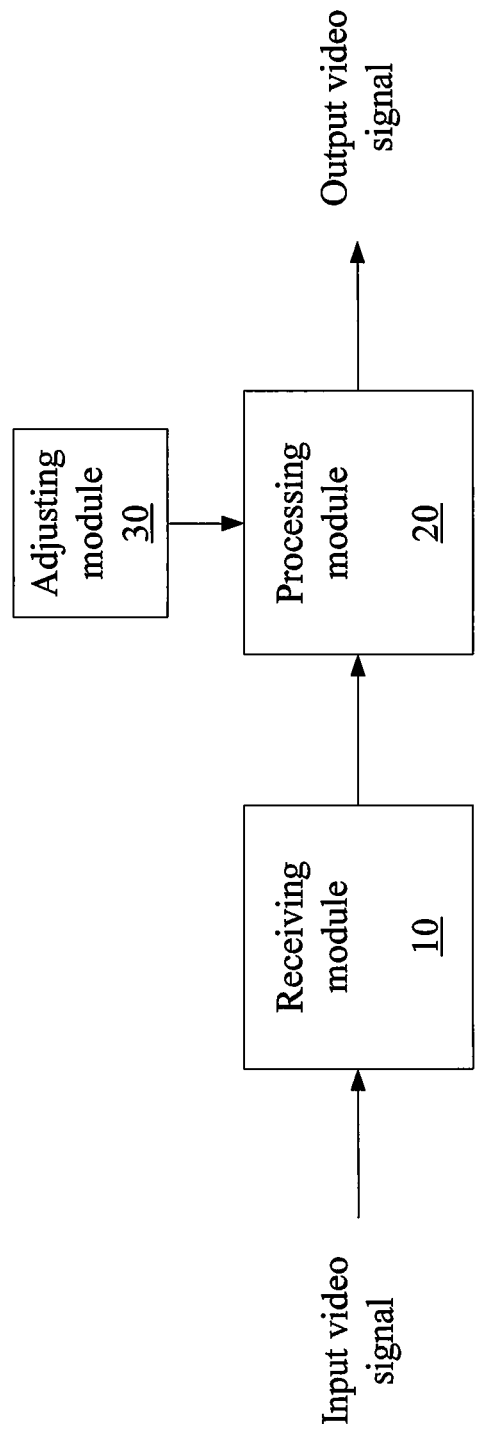
FIG. 2 is a schematic view of a second embodiment of the video processing device.

FIG. 2 is a schematic view of a second embodiment of the video processing device. Referring to FIG. 2, the video processing device according to the second embodiment further includes an adjusting module 30.

When a distance of the motion of the video object is large, image lag and doubling may occur easily. The reason is that eyes may perform a low-pass on a time axis on the image, such that a person will see two objects overlapping (mixed) on the time axis. Therefore, in the disclosure, the adjusting module 30 is used to adjust brightness of a plurality of preset frames in the output video signal, so as to obtain a black frame. That is to say, the brightness of certain original frames in the output video signal is adjusted lower, such that the black frame is mixed in the output video signal, such that persistence of a previous image of the human eyes is eliminated, so as not to overlap a next image, thereby solving the image lag and doubling problem. The preset frames may be selected by a user, or automatically selected by a system. In an embodiment, the black frame is located on a conversion between the first output frame and the second output frame, but may be located on other positions in the output video signal according to different requirements. The position of the black frame is not limited here.

In addition to the black frame, the adjusting module 30 may also adjust the certain frames in the output video signal to a gray frame. Similarly, the gray frame is located on the conversion between the first output frame and the second output frame, and the position thereof is not limited here.

Figure 3:
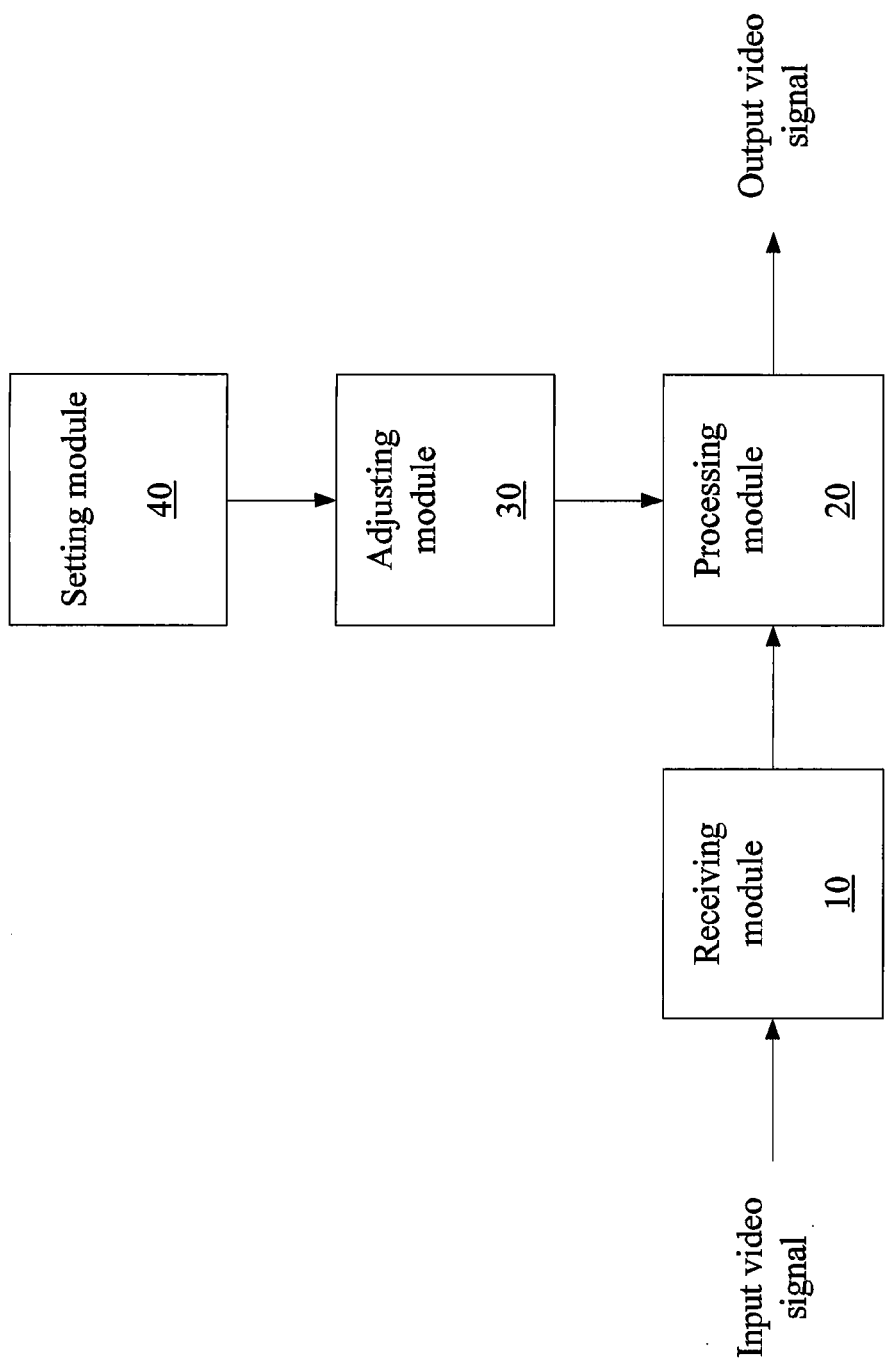
FIG. 3 is a schematic view of a third embodiment of the video processing device.

FIG. 3 is a schematic view of a third embodiment of the video processing device. Referring to FIG. 3, the video processing device according to the third embodiment further includes a setting module 40.

In the technique of adjusting the black frame or the gray frame, the black frame or the gray frame is formed by adjusting the brightness of the frames of the output video signal, thereby achieving preferable motion visual persistence. However, the average brightness may become lower, and if a frame-rate is too low, the user has a flickering feeling. Therefore, in the disclosure, the setting module 40 is used to set the average brightness of the output video signal. Here, the user may set the desired average brightness by using the setting module 40, or the system automatically sets the preferred average brightness. The adjusting module 30 adjusts the brightness of the plurality of preset frames in the output video signal according to the average brightness, so as to obtain the black frame and/or the gray frame. Therefore, the brightness of each frame in the output video signal may be adjusted. The brightness of each or certain frames may be adjusted according to the average brightness, such that the overall brightness of the output video signal complies with the set average brightness.

Figure 4:
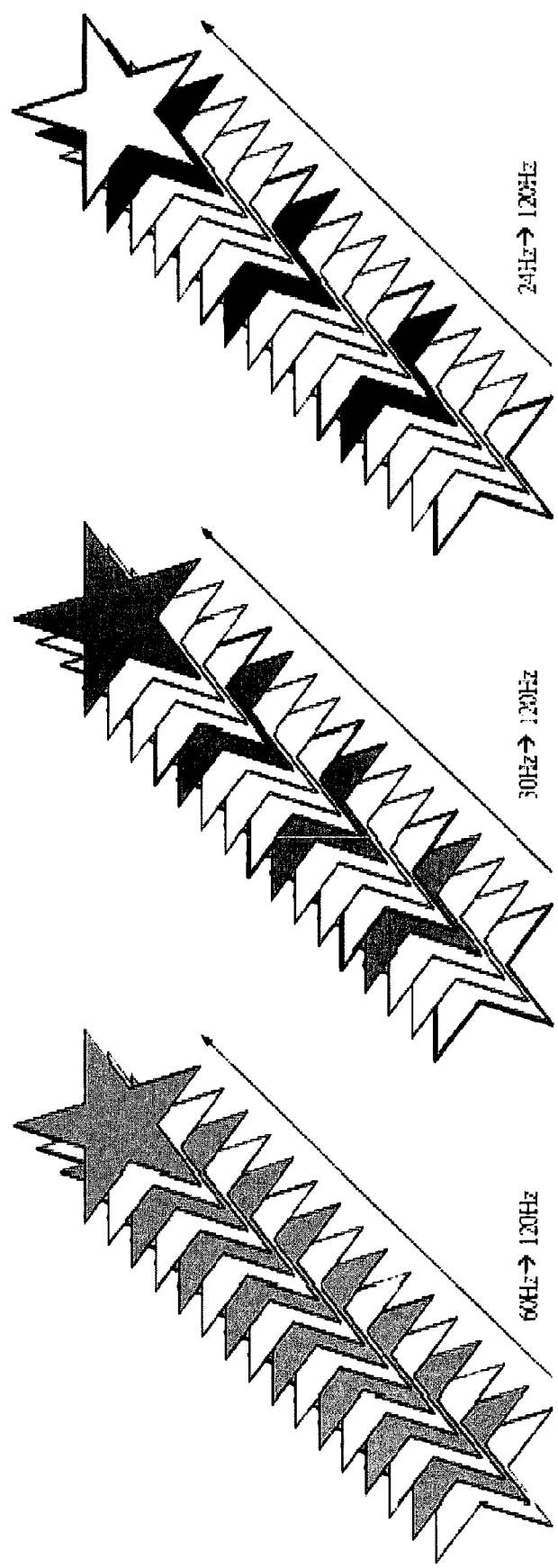
FIG. 4 is a schematic view of a frame in video processing.

FIG. 4 is a schematic view of a video processing frame. Referring to FIG. 4, for the output video signal according to the disclosure, the frequency is 120 Hz, so a refresh-rate is high enough, such that the serious flickering is not generated. It is assumed that the average brightness of the output video signal set by the setting module 40 is 4/5 of the original brightness when the black frame or the gray frame is not generated, and thus, the brightness does not differ too much, so the user does not have a too large visual difference.

FIG. 4 illustrates three embodiments. The rightmost part will be described first. In this embodiment, 24 Hz is converted to 120 Hz. It may be known from the description that through the processing module 20 according to the disclosure, the proportion between the amount of the first output frames and the amount of the second output frames in the single period of the output video signal in the embodiment is 5:5. It is assumed that the original brightness of the frame is "1", the brightness of the black frame is "0", and the brightness of the gray frame is a value between 0 and 1. Here, the frame located on the conversion between the first output frame and the second output frame is adjusted to the black frame or the gray frame; therefore, for the embodiment, when the same 5 frames are converted to another frame, one black frame or gray frame is formed to replace the original frame. The average brightness set by the setting module 40 is 4/5, such that one black frame having a brightness of "0" (4/5=(1+1+1+1+"0")/5) must be formed on the conversion among 5 frames in the output video signal. Therefore, it is known from the rightmost part of FIG. 4 that the brightness is adjusted on a position of each $5^{th}$ frame, so as to form a black frame to replace the original frame, such that the average brightness of the output video signal is maintained at 4/5.

For a middle part of FIG. 4, in this embodiment, 30 Hz is converted to 120 Hz. It may be known from the description that the proportion between the amount of the first output frames and the amount of the second output frames in the single period of the output video signal in the embodiment is 4:4. It is assumed that the average brightness set by the setting module 40 is 4/5, such that one gray frame having a brightness of "1/5" (4/5=(1+1+1+"1/5")/4) must be formed on the conversion among 4 frames in the output video signal. Therefore, it is known from the middle part of FIG. 4 that the brightness is adjusted on a position of each $4^{th}$ frame, so as to form a gray frame having a brightness of "1/5" to replace the original frame, such that the average brightness of the output video signal is maintained at 4/5.

For a leftmost part of FIG. 4, in this embodiment, 60 Hz is converted to 120 Hz. 120 Hz is twice of 60 Hz, so the 60 Hz image data needs to repeat once to convert 60 Hz to 120 Hz. Therefore, the original one frame is repeated to become two frames, that is, the proportion between the amount of the first output frames and the amount of the second output frames is 2:2. The average brightness set by the setting module 40 is 4/5, such that one gray frame having a brightness of "3/5" (4/5=(1+"3/5")/2) must be formed on the conversion between 2 frames in the output video signal. Therefore, it is known from the leftmost part of FIG. 4 that the brightness is adjusted on a position of each $2^{nd}$ frame, so as to form a gray frame having the brightness of "3/5", such that the average brightness of the output video signal is maintained at 4/5.

Figure 5:
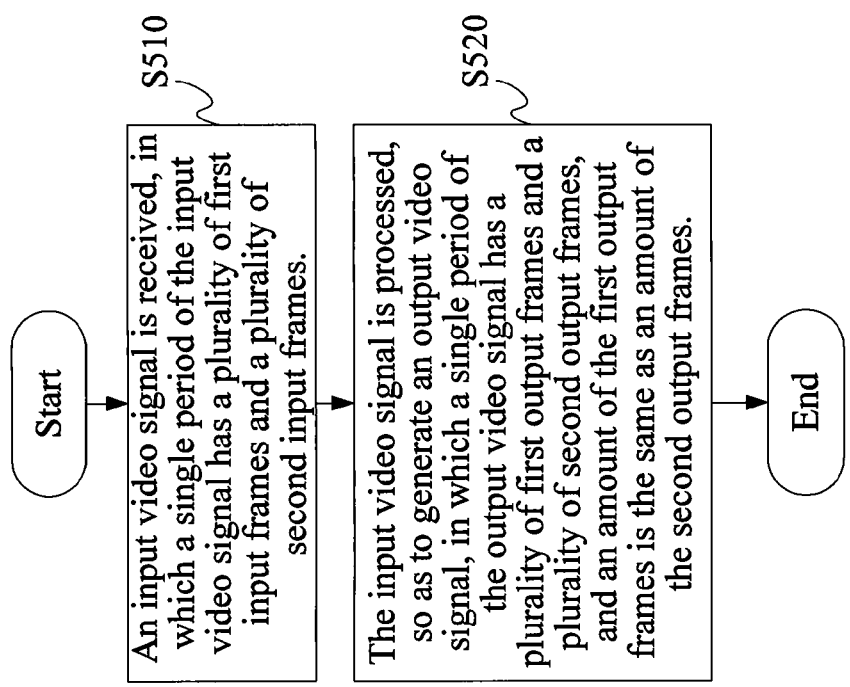
FIG. 5 is a flow chart of a first embodiment of a video processing method.

FIG. 5 is a flow chart of a first embodiment of a video processing method. Referring to FIG. 5, the method includes the steps as follows.

In Step S510, an input video signal is received, in which a single period of the input video signal has a plurality of first input frames and a plurality of second input frames.

In Step S520, the input video signal is processed, so as to generate an output video signal, in which a single period of the output video signal has a plurality of first output frames and a plurality of second output frames, and an amount of the first output frames is the same as an amount of the second output frames.

A sum of the amount of the first output frames and the amount of second output frames is an integer multiple of a sum of an amount of the first input frames and an amount of the second input frames.

A proportion between the amount of the first input frames and the amount of the second input frames is a first proportion, and a proportion between the amount of the first output frames and the amount of the second output frames is a second proportion. The input video signal may be a 3:2 pull down image, and at this time, the first proportion is 3:2, and the second proportion is 5:5.

A frequency of the input video signal is selected from a group consisting of 24 Hz, 30 Hz, 60 Hz, and any combination thereof. A frequency of the output video signal may be 120 Hz. It should be noted that the frequency of the output video signal of 120 Hz is only one embodiment, and in another embodiment, the frequency of the output video signal may be 180 Hz or 240 Hz.

Step S520 may further include a step as follows. Brightness of a plurality of preset frames in the output video signal is adjusted, so as to obtain a black frame and/or a gray frame. Each preset frame may be located on a conversion between the first output frame and the second output frame, which, however, is not limited here.

Step S520 may further include the steps as follows. An average brightness of the output video signal is set, in which the average brightness may be set by a user or preset by a system. The brightness of the plurality of preset frames in the output video signal is adjusted, so as to obtain the black frame and/or the gray frame.

Figure 6:
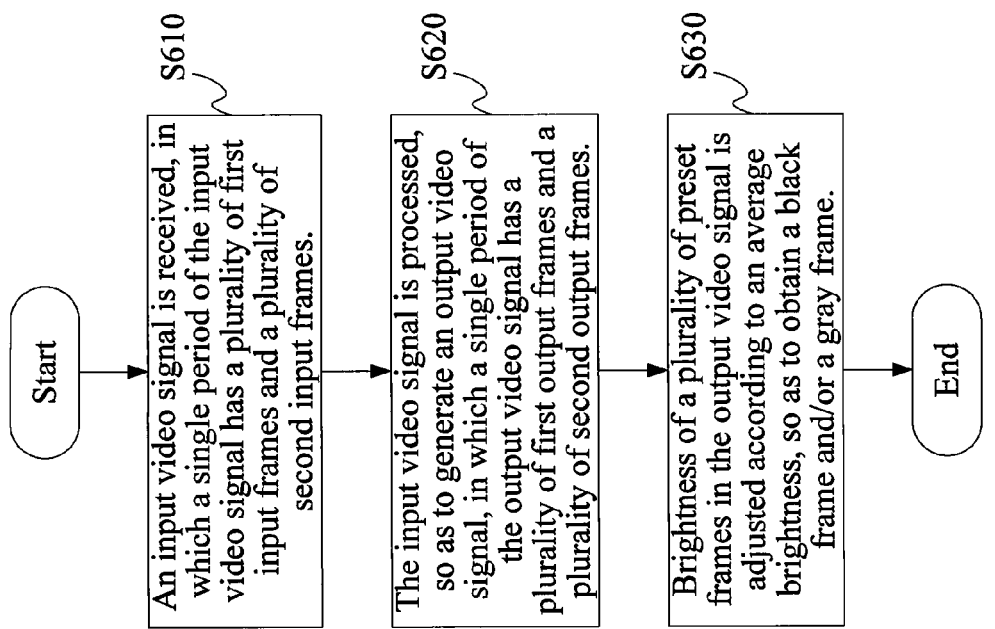
FIG. 6 is a flow chart of a second embodiment of the video processing method.

FIG. 6 is a flow chart of a second embodiment of the video processing method. Referring to FIG. 6, the method includes the steps as follows.

In Step S610, an input video signal is received, in which a single period of the input video signal has a plurality of first input frames and a plurality of second input frames.

In Step S620, the input video signal is processed, so as to generate an output video signal, in which a single period of the output video signal has a plurality of first output frames and a plurality of second output frames, and an amount of the first output frames is the same as an amount of the second output frames.

In Step S630, brightness of a plurality of preset frames in the output video signal is adjusted according to an average brightness, so as to obtain a black frame and/or a gray frame. Each preset frame may be located on a conversion between the first output frame and the second output frame.

A proportion between the amount of the first input frames and the amount of the second input frames is a first proportion, and a proportion between the amount of the first output frames and the amount of the second output frames is a second proportion. The input video signal may be a 3:2 pull down image, and at this time, the first proportion is 3:2, and the second proportion is 5:5.

A frequency of the input video signal is selected from a group consisting of 24 Hz, 30 Hz, 60 Hz, and any combination thereof. A frequency of the output video signal may be 120 Hz.

Though the disclosure has been disclosed above by the preferred embodiments, they are not intended to limit the disclosure. Anybody skilled in the art can make some modifications and variations without departing from the spirit and scope of the disclosure. Therefore, the protecting range of the disclosure falls in the appended claims.

What is claimed is:

1. A video processing method, comprising:
   receiving an input video signal, wherein a single period of the input video signal has input frames of a first type and input frames of a second type, wherein a number of the input frames of the first type does not equal a number of the input frames of the second type; and
   processing the input video signal, so as to generate an output video signal, wherein a single period of the output video signal has output frames of the first type and output frames of the second type, wherein a number of the output frames of the first type equals a number of the output frames of the second type;
   wherein a sum of the number of the output frames of the first type and the number of the output frames of the second type is an integer multiple of a sum of the number of the input frames of the first type and the number of the input frames of the second type.

2. The video processing method according to claim 1, wherein a proportion between the number of the input frames of the first type and the number of the input frames of the second type is a first proportion, and the proportion between the number of the output frames of the first type and the number of the output frames of the second type is a second proportion.

3. The video processing method according to claim 2, wherein the input video signal is a 3:2 pull-down image, and the first proportion is 3:2.

4. The video processing method according to claim 3, wherein the second proportion is 5:5.

5. The video processing method according to claim 1, wherein a frequency of the input video signal is selected from a group consisting of 24 Hz, 30 Hz, 60 Hz, and any combination thereof.

6. The video processing method according to claim 5, wherein a frequency of the output video signal is selected from a group consisting of 120 Hz, 180 Hz, 240 Hz, and any combination thereof.

7. The video processing method according to claim 1, wherein the step of processing the input video signal further comprises:
   adjusting brightness of at least one preset frame in the output video signal, so as to obtain a black frame.

8. The video processing method according to claim 7, wherein the at least one preset frame is located on a conversion between a first output frame and a second output frame.

9. The video processing method according to claim 1, wherein the step of processing the input video signal further comprises:
   adjusting brightness of at least one preset frame in the output video signal, so as to obtain a gray frame.

10. The video processing method according to claim 9, wherein the at least one preset frame is located on a conversion between a first output frame and a second output frame.

11. The video processing method according to claim 1, wherein the step of processing the input video signal further comprises:
    setting an average brightness of the output video signal; and
    adjusting brightness of a plurality of preset frames in the output video signal according to the average brightness, so as to obtain at least one of a black frame or a gray frame.

12. A video processing method, comprising:
    receiving an input video signal, wherein a single period of the input video signal has a plurality of first input frames and a plurality of second input frames;
    processing the input video signal, so as to generate an output video signal, wherein a single period of the output video signal has a plurality of first output frames and a plurality of second output frames; and
    adjusting a brightness of a plurality of preset frames in the output video signal according to a preset average brightness level, wherein the preset average brightness level is set by one of a user or by an automatic setting module, so as to obtain at least one of a black frame or a gray frame.

13. The video processing method according to claim 12, wherein each of the plurality of preset frames is located on a conversion between a first output frame and a second output frame.

14. The video processing method according to claim 12, wherein an amount of the first output frames is the same as an amount of the second output frames.

15. The video processing method according to claim 12, wherein a proportion between an amount of the first input frames and an amount of the second input frames is a first proportion, and a proportion between an amount of the first output frames and an amount of the second output frames is a second proportion.

16. The video processing method according to claim 15, wherein the input video signal is a 3:2 pull-down image, and the first proportion is 3:2.

17. The video processing method according to claim 16, wherein the second proportion is 5:5.

18. The video processing method according to claim 12, wherein a frequency of the input video signal is selected from a group consisting of 24 Hz, 30 Hz, 60 Hz, and any combination thereof.

19. The video processing method according to claim 18, wherein a frequency of the output video signal is selected from a group consisting of 120 Hz, 180Hz, 240Hz, and any combination thereof.

20. A video processing device, comprising:
    a receiving module, receiving an input video signal, wherein a single period of the input video signal has input frames of a first type and second input frames of a second type, wherein a number of the input frames of the first type does not equal a number of the input frames of the second type; and a processing module, processing the input video signal, so as to generate an output video signal, wherein a single period of the output video signal has output frames of the first type and output frames of the second type, wherein a number of the output frames of the first type equals a number of the output frames of the second type, and wherein a sum of the number of the output frames of the first type and the number of the output frames of the second type is an integer multiple of a sum of an number of the input frames of the first type and an number of the input frames of the second type.

21. The video processing device according to claim 20, wherein a proportion between the number of the input frames of the first type and the number of the second input frames is a first proportion, and a proportion between the number of the first output frames and the number of the second output frames is a second proportion.

22. The video processing device according to claim 21, wherein the input video signal is a 3:2 pull-down image, and the first proportion is 3:2.

23. The video processing device according to claim 22, wherein the second proportion is 5:5.

24. The video processing device according to claim 20, wherein a frequency of the input video signal is selected from a group consisting of 24 Hz, 30 Hz, 60 Hz, and any combination thereof.

25. The video processing device according to claim 24, wherein a frequency of the output video signal is selected from a group consisting of 120 Hz, 180Hz, 240Hz, and any combination thereof.

26. The video processing device according to claim 20, further comprising:
an adjusting module, adjusting brightness of a plurality of preset frames in the output video signal, so as to obtain a black frame.

27. The video processing device according to claim 26, wherein the at least one preset frame is located on a conversion between a first output frame and a second output frame.

28. The video processing device according to claim 20, further comprising:
an adjusting module, adjusting brightness of a plurality of preset frames in the output video signal, so as to obtain a gray frame.

29. The video processing device according to claim 28, wherein the at least one preset frame is located on a conversion between a first output frame and a second output frame.

30. The video processing device according to claim 20, further comprising:

a setting module, setting an average brightness of the output video signal; and an adjusting module, adjusting brightness of a plurality of preset frames in the output video signal according to the average brightness, so as to obtain at least one of a black frame or a gray frame.

31. A video processing device, comprising:
a receiving module, receiving an input video signal, wherein a single period of the input video signal has a plurality of first input frames and a plurality of second input frames;

a processing module, processing the input video signal, so as to generate an output video signal, wherein a single period of the output video signal has a plurality of first output frames and a plurality of second output frames;

a setting module, setting an average brightness of the output video signal; and an adjusting module, adjusting a brightness of a plurality of preset frames, comprising a portion of the output video signal, according to a preset average brightness level, wherein the preset average brightness level is set by one of a user or by an automatic setting module, so as to obtain at least one of a black frame or a gray frame.

32. The video processing device according to claim 31, wherein each of the plurality of preset frames is located on a conversion between a first output frame and a second output frame.

33. The video processing device according to claim 31, wherein a number of the first output frames is the same as a number of the second output frames.

34. The video processing device according to claim 31, wherein a proportion between a number of the first input frames and a number of the second input frames is a first proportion, and a proportion between a number of the first output frames and a number of an second output frames is a second proportion.

35. The video processing device according to claim 34, wherein the input video signal is a 3:2 pull-down image, and the first proportion is 3:2.

36. The video processing device according to claim 35, wherein the second proportion is 5:5.

37. The video processing device according to claim 31, wherein a frequency of the input video signal is selected from a group consisting of 24 Hz, 30 Hz, 60 Hz, and any combination thereof.

38. The video processing device according to claim 35, wherein a frequency of the output video signal is selected from a group consisting of 120 Hz, 180Hz, 240Hz, and any combination thereof.

* * * * *